June 19, 1928. 1,674,309
C. P. TOPPING
FEED MECHANISM FOR NUTS AND THE LIKE
Filed Jan. 26, 1926 5 Sheets-Sheet 1

Inventor
Charles P. Topping
By his Attorney

June 19, 1928.  1,674,309
C. P. TOPPING
FEED MECHANISM FOR NUTS AND THE LIKE
Filed Jan. 26, 1926  5 Sheets-Sheet 2

Inventor
Charles P. Topping
By his Attorney

June 19, 1928.
C. P. TOPPING
1,674,309
FEED MECHANISM FOR NUTS AND THE LIKE
Filed Jan. 26, 1926   5 Sheets-Sheet 3
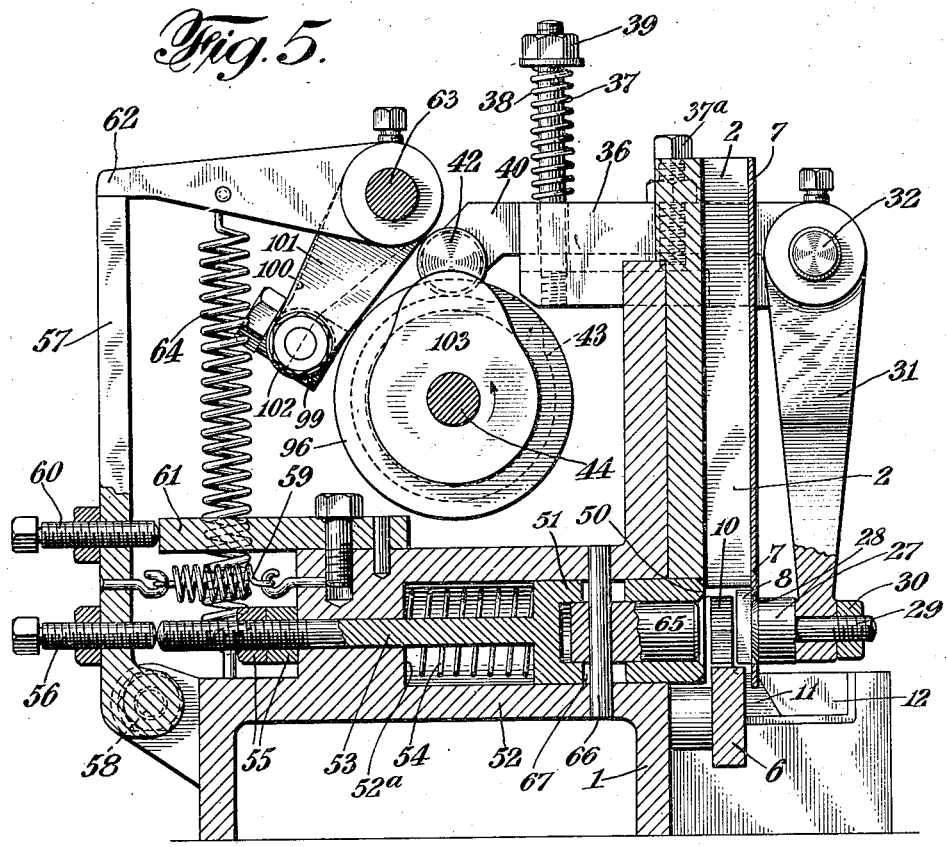
Inventor
Charles P. Topping
By his Attorney
George C. Mean June 19, 1928. 1,674,309
C. P. TOPPING
FEED MECHANISM FOR NUTS AND THE LIKE
Filed Jan. 26, 1926   5 Sheets-Sheet 4

Inventor
Charles P. Topping
By his Attorney

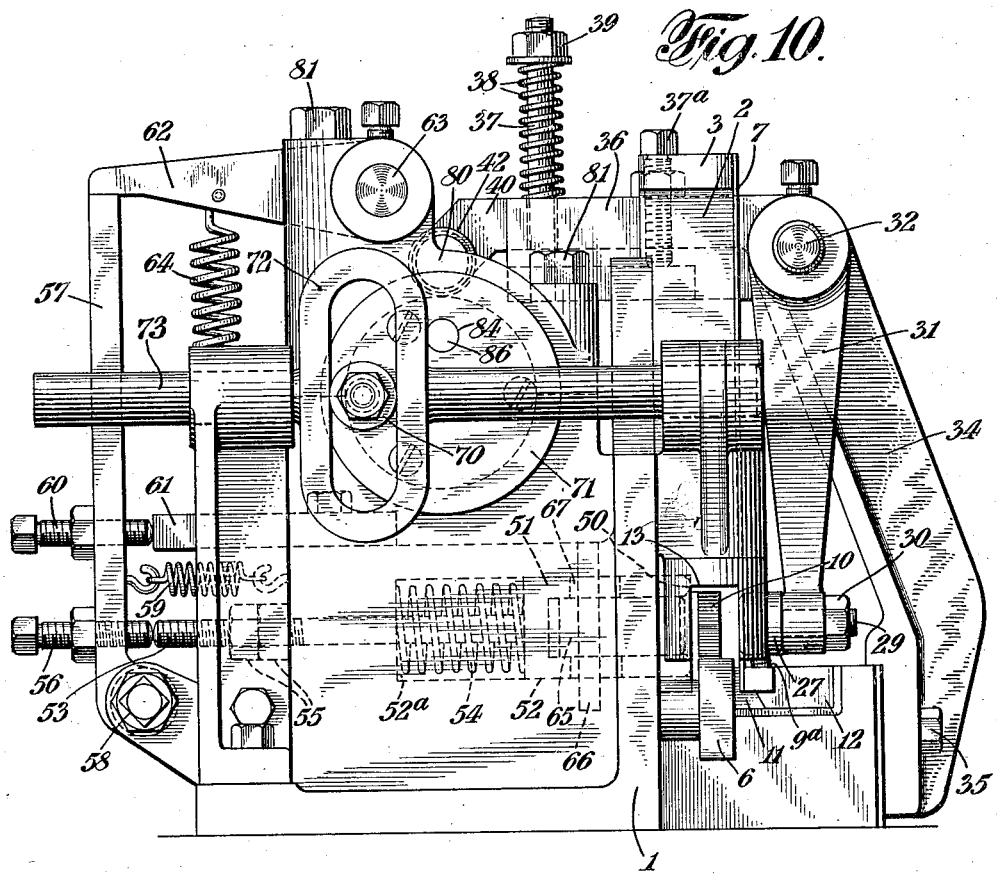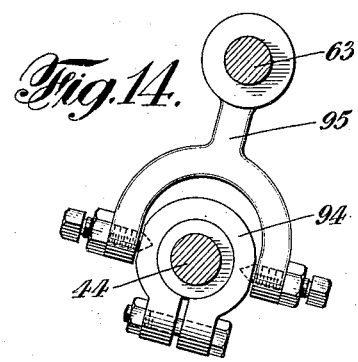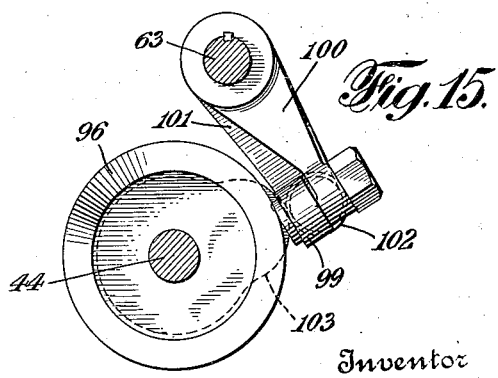

Patented June 19, 1928.

1,674,309

UNITED STATES PATENT OFFICE.

CHARLES P. TOPPING, OF NORTH TONAWANDA, NEW YORK, ASSIGNOR TO BUFFALO BOLT COMPANY, OF NORTH TONAWANDA, NEW YORK, A CORPORATION OF NEW YORK.

FEED MECHANISM FOR NUTS AND THE LIKE.

Application filed January 26, 1926. Serial No. 83,977.

My present invention is shown as embodied in a machine whereby crowned nuts fed in train through a guideway may have their crowns all presented in the same direction for proper presentation for some other operation as, for instance, facing the bottom surface of the nut or slotting the crown surface or for presenting the bottom surface in a machine for screwing the nuts on the shanks of bolts or the like.

The machine in its present form includes a detector, that is, a mechanism rendered differently operative or inoperative according to which direction each nut in the train happens to face. As this mechanism is preferably operated by pressure transmitted through each nut and depends for its operation on the difference in contour of the opposite faces or ends thereof, it is obvious that this and other features of my invention may be employed for operation in connection with other articles that have differently shaped faces or ends and for purposes other than turning like contours in the same direction.

In the form herein shown, the nuts fall by gravity through a chute leading from a hopper or other source of supply and are stopped between relatively movable feeling members, one of which is a trigger device, a release member of which is engaged and operated, or not, according to the shape of the nut surface that is presented to it. Immediately thereafter the nut is pushed into a movable section of the exit guideway, which is of proper size and length to accommodate only one nut at a time and which is mounted for 180° rotation about a transverse axis of the nut. So long as the nuts come through with their crowns in the proper direction, the detector release remains inoperative and the nuts are forced, one at a time, through this turner section of the exit guideway, but if the nut is presented the wrong way, the corresponding face contour becomes effective for operating the detector feeler. The latter is a trigger device which sets in operation a delayed train of mechanism including a clutch whereby the turner section will operate to rotate the nut through 180° just after the pusher has fed it into the turner section of the exit guideway. In this way, the nuts are fed through the machine at a regular rate, those facing in the proper direction passing through the turner just as if it were a fixed part of the guideway while those that are faced in the wrong direction are turned to face in the right direction.

The above and other features of my invention will be more readily understood from the following description in connection with the accompanying drawings, in which Fig. 1 is a plan view of the machine;

Fig. 5 is a transverse section on the line $c$—$c$, Fig. 2;

Fig. 6 is a detail view of the detector portion of the mechanism shown in Fig. 5, with a nut shown in primary position therein;

Fig. 7 is a similar view of the same parts with the pusher operated to force the nut into contact with the feeler, the nut in this case having its flat face engaging the latter;

Fig. 8 is a precisely similar view showing the different position of the parts when the crown of the nut is presented toward the feeler;

Fig. 10 is also an end elevation of the machine, but viewed from the left, Fig. 1;

Fig. 14 is a detail section on the line $f$—$f$, Fig. 1, showing the shafts in vertical section and clutch operating parts in elevation; and Fig. 15 is a similar detail section on the line $g$—$g$, Fig. 1.

Figures 1, 4:
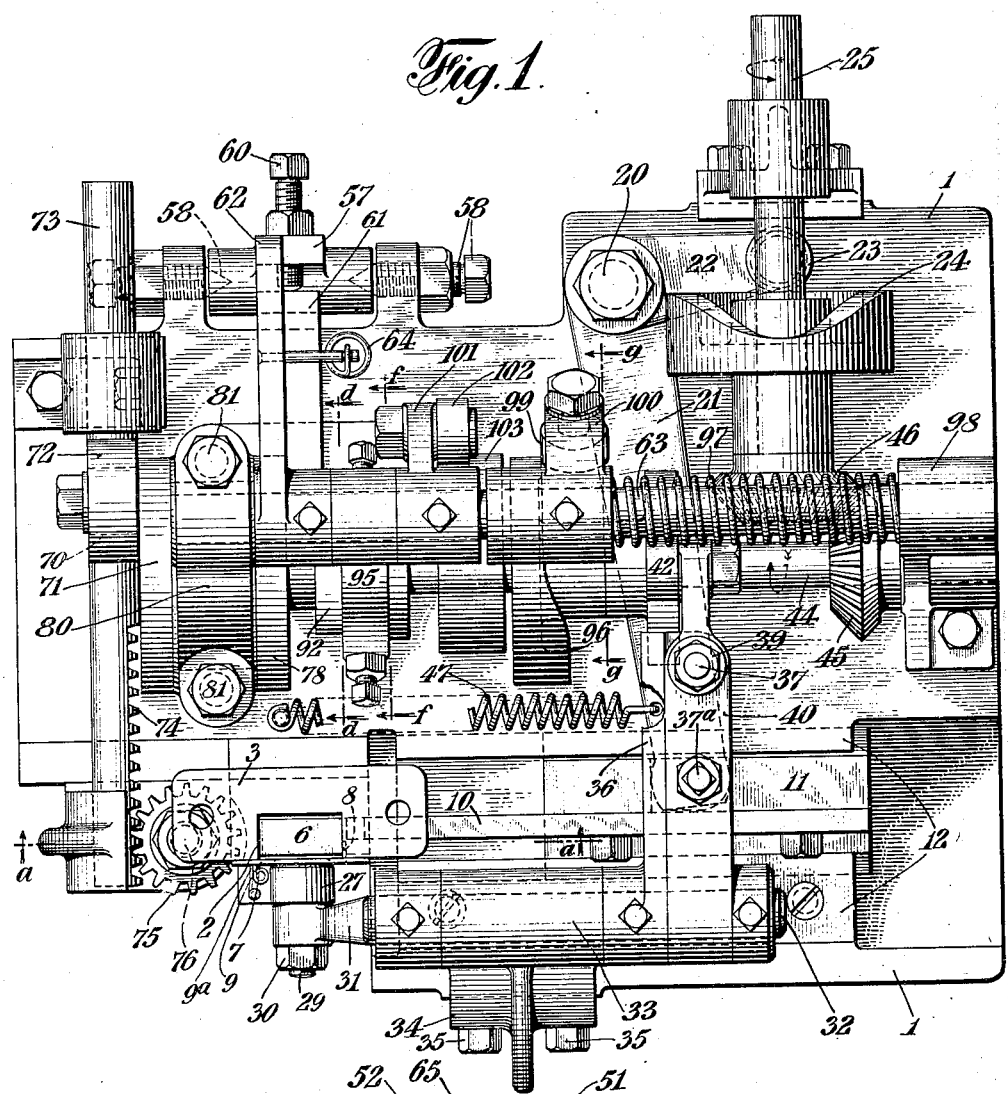
Fig. 4 is a horizontal sectional detail on the line $b$—$b$, Fig. 3.
Figure 2:
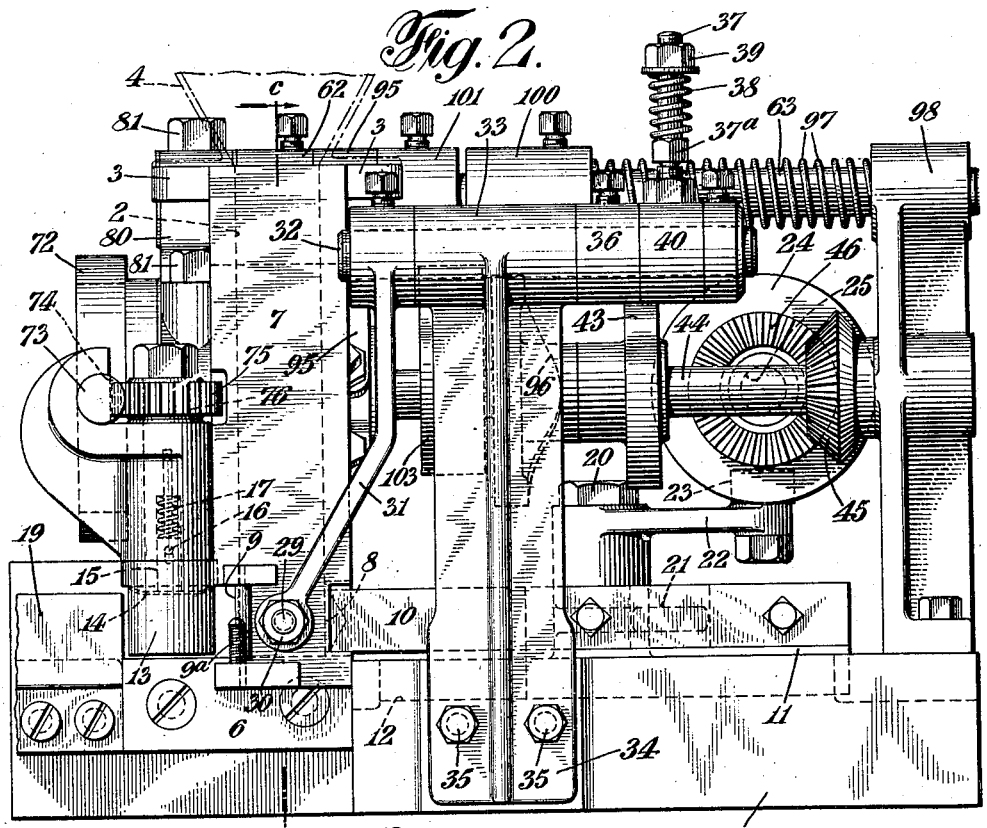
Fig. 2 is an elevation of what may be considered as the front of the machine.
Figure 3:
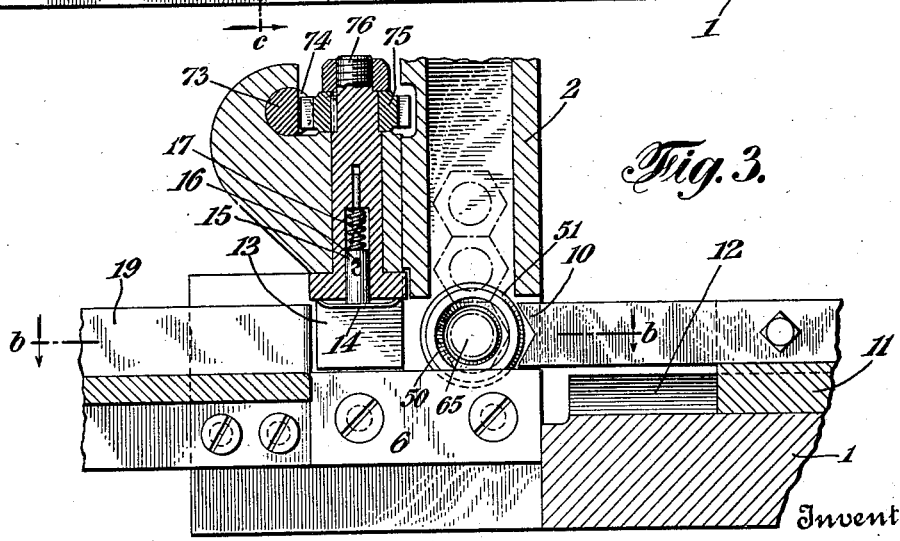
Fig. 3 is a vertical detail section on the line $a$—$a$, Fig. 1.

Referring primarily to Figs. 1 and 2, it will be seen that the machine comprises a suitable base, 1, carrying standards supporting the various operating parts. The primary feeding means for the nuts is shown as comprising a vertical guideway, 2, formed at the upper end with flanges, 3, which may support any suitable hopper feed mechanism as diagrammatically indicated at 4, Fig. 2. As shown more in detail in Fig. 3, the nuts fall edgewise on a horizontal upper surface of a support member, 6. As shown in Fig. 4, there is preferably an outer guide-plate, 7, having a gauge finger, 8, projecting inwardly just sufficient to engage the periphery of the nut on the rear side thereof. The forward side is preferably similarly gauged and positioned by pivoted member, 9, yieldingly supported by spring, 9ª. The nuts, dropping one at a time into this position, are directly in front of a feed plunger, 10, mounted in a carriage, 11, reciprocating in guides, 12.

Figure 9:
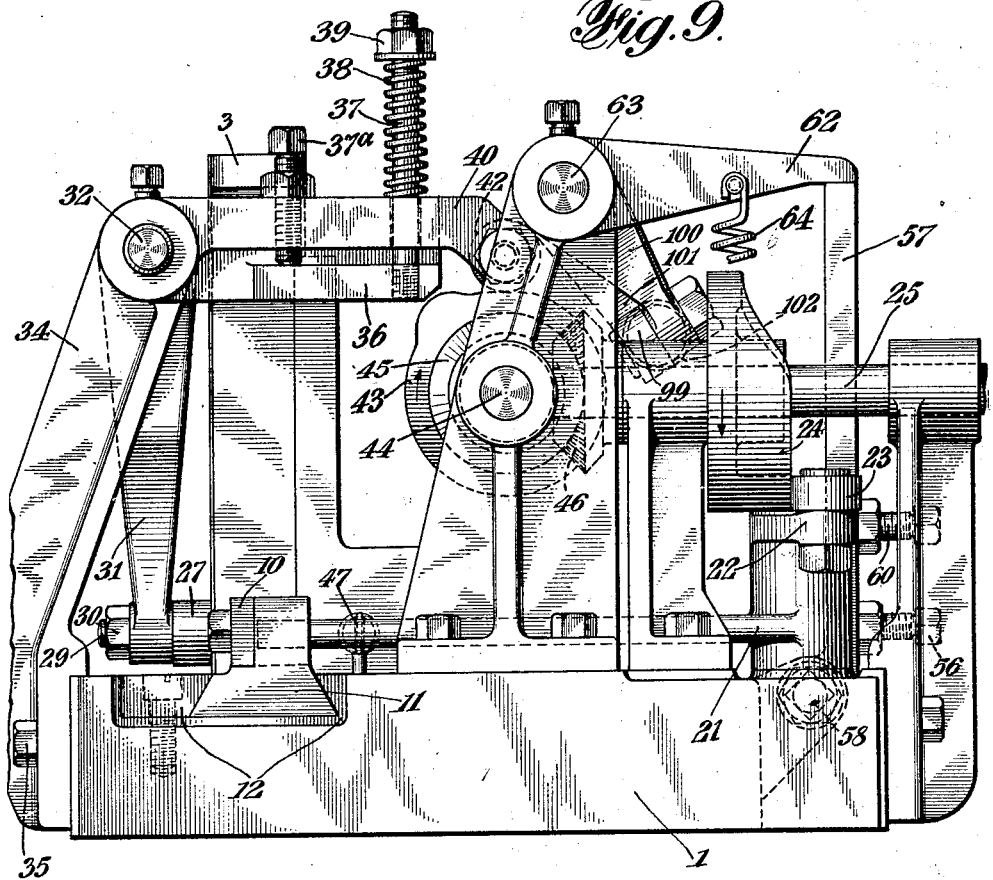
Fig. 9 is an end elevation of the machine viewed from the right, Fig. 1.

This feed plunger, 10, is intermittently reciprocated to force the nuts, one at a time, into an exit guide section, 13, in which the nut is firmly held by a presser foot, 14, on plunger, 15, having limited vertical play on pin, 16, and urged downward by spring, 17. During the forward movement of the plunger to feed a nut into this section, 13, the column of nuts in 2 is sustained by the upper horizontal surface of the plunger, 10. The next nut falls in front of the plunger when it is retracted and when this nut is pushed forward, the nut in guide section, 13, is pushed into the exit guide, 19, leading to any desired machine or device for operation upon or in connection with the nuts. The plunger, 10, is intermittently reciprocated, as above described, by means of a bell crank lever pivoted on the base of the machine, as at 20. The arm, 21, of the bell crank engages the slide, while arm, 22, has an antifriction roller, 23, engaging cam, 24, on the primary driving shaft, 25, which is rotated from any suitable source of power, at any desired rate, (see Fig. 9).

The above constitutes the primary means for regular intermittent, one by one, edgewise feed of a train of nuts having their crown and bottom faces parallel with the direction of feed. As before explained, the crowns and bottoms of the nuts are haphazard, some being presented in one direction and others in the opposite direction.

The means for detecting those presented in the wrong direction is located at the point where the nuts fall on support surface, 6, and are centered by the guide members, 8, 9. This mechanism is best shown in Figs. 5 to 8, inclusive. Adjacent the face of the nut in this position is a pusher gauge member, 27, adapted to reciprocate through an opening, 28, in the guard-plate, 7, and secured by shank, 29, and nut, 30, to the end of the arm, 31, of a bell crank lever mounted on pivot shaft, 32, rotatably supported in bearing, 33, carried by bracket, 34, secured to base, 1, as by bolts, 35. The other arm, 36, of the bell crank (see Fig. 9) carries a vertical guidebolt, 37, encircled by spring, 38, secured at the upper end by nut, 39, and bearing at the lower end on top of a radial arm, 40, having at the end thereof an antifriction roll, 42, bearing on cam, 43, on a shaft, 44, which is driven through miter gear, 45, by mating gear, 46, on the primary power shaft, 25, described above. It will be understood that the radial arm, 40, is loose on pivot shaft, 32, and that the cam thrust on the roller, 42 is applied to the bell crank arm, 36, through the springs, 37, securing nut, 39, and bolt, 38, so that if a nut is jammed or if for any other reason the gauge plunger, 27, encounters undue resistance, the free arm, 40, may be cammed upward, compressing the spring, 37, thereby preventing breakage of the parts. The normal angular relation of 36 and 40 is adjusted by set screw 37ª.

The thrust of feed cam, 24, is timed to the release period of cam, 24, so that the transverse push of gauge pusher, 27, upon the nut occurs during the period when the feed plunger, 10, is retracted. The forward or feeding movement of plunger, 10, is caused by tension spring, 47, the depression in face cam, 24, permitting such spring-urged movement, while the retracting movement is positive.

As shown in Figs. 5 to 8, the nut in the gauging position is directly opposite the feeler annulus, 50, formed on the end of plunger, 51. This plunger is endwise slidable in guideway, 52, and has a rearward stem, 53. The plunger is pressed forward by compression spring, 54, to a gauged position exactly adjustable by nuts, 55, on stem 53, engaging the rear face of the stem guide, 52ª. The rear end of 53 is normally in contact with an adjustable screw bolt, 56, in a trip lever, 57, pivoted in the frame at 58, pulled forward by spring, 59 to a vertical position predetermined by adjustable bolt, 60, engaging a stationary member, 61. The upper end of the lever, in the position shown in Fig. 5, affords a support or latch for the free end of lever, 62, pivotally mounted on shaft, 63, and tensed downward by spring, 64, so that the free end, 62, will fall whenever the trip, 57, is moved by rearward movement of plunger, 51, and its rearward extension, 53.

It will be noted that the nut engaging face of annulus, 50, is concaved to correspond to the convex crown of a nut. Consequently, when the crown of a nut is presented, as shown in Fig. 8, the forward pressure of gauge plunger, 27, only serves to bring the central portion of the nut in contact with a stationary stop, 65, anchored by cross bolt, 66, in the guide portion, 52, of the frame, slots, 67, being provided in the walls of annular plunger, 51, so that endwise movement of the plunger is not limited or impeded. On the other hand, when the base of the nut is presented toward the annulus, 50, as shown in Fig. 6, and thereafter the gauge block, 27, is forced forward, as shown in Fig. 7, the base of the nut does engage the annulus and forces plunger, 51, backward to the position shown, thereby releasing trip, 57.

The above described release trip, 57, operates an intermittent clutch mechanism which will be described below, thereby rotating the anti-friction roller, 70, on disc, 71, a half revolution. This roller, 70, engages a Scotch yoke, 72, thereby reciprocating rack member, 73, which, as shown in Fig. 1, has a rack, 74, engaging a pinion, 75, on the upper end of shaft, 76, which shaft carries at the lower end thereof the above described guide-section, 13, and which has housed therein the presser foot mechanism for holding the nut in said guide. In the proportions shown in the drawings, the throw of the rack is exactly one-half the periphery of the gear, 75. Consequently, the rotation of the guide section, 13, is exactly 180°. The clutch having made a half revolution, the guide 13 remains in the reversed position until the trip mechanism again works. The clutch mechanism for causing the half rotation and throw-out and the mechanism for restoring the trip will now be described.

Figure 11:
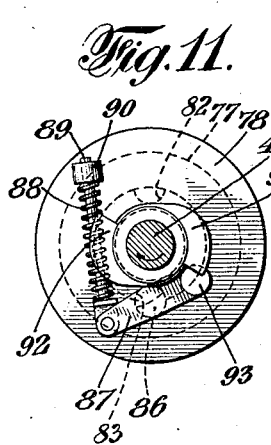
Fig. 11 is a detail view on the line $d$—$d$, Fig. 1, the shaft being shown in vertical section with the clutch for operating the nut turner in end elevation.
Figure 12:
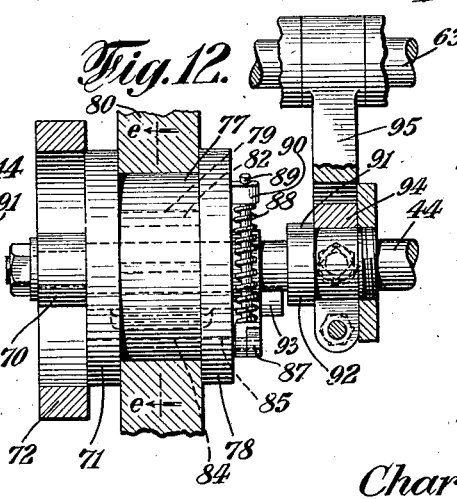
Fig. 12 is a detail view showing the same clutch in side elevation as viewed from the left, Fig. 11.
Figure 13:
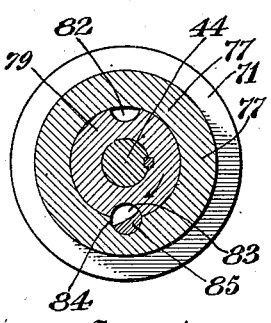
Fig. 13 is a section on the line $e$—$e$, Fig. 12.

Referring to Fig. 1, it will be seen that the disc, 71, carrying the roller, 70, that reciprocates the Scotch yoke, 72 (Fig. 10), is the end of the driven member of the clutch shown in detail in Figs. 11, 12 and 13, said disc 71 being rigid with a barrel member, 77, closed in at the other end by a similar disc, 78, through which projects the continuously rotating drive shaft, 44, which has keyed to it the continuously rotating clutch member, 79, the latter being in effect a cylindrical head closed in by the normally stationary member 77. The latter member, shown separately in Fig. 12, has its barrel portion, rotatably mounted in a bearing, the upper half, 80, of which is secured by bolts, 81, the bearing fitting between the end discs, 71 and 78, so that endwise play of the latter is prevented. The means for clutching the continuously rotating driver member, 79, to the intermittently driven member, 77, is what is known as the rolling pin type of clutch. As shown in Fig. 13, the driver, 79, has in its periphery two diametrically opposite semi-cylindrical grooves, 82, 83, while the driven member, 77, has an inner cylindrical groove, 84, which when in registry with either 82 or 83 affords a complete cylindrical housing for the rolling pin, 85, which is in the nature of a pawl projecting into and engaging the driver when in the position shown in Fig. 13, but adapted to be rotated to a position where it will be disengaged and completely housed within the barrel, 77. This rotary pawl, 85, is integral with a shaft, 86, that projects through the end, 78, of the driven clutch member and the rolling movement into and out of engagement is controlled by a lever, 87, having at one end means normally tending to press the pawl to the engaged position as, for instance, by a spring 88, encircling a rod, 89, which is pivoted to the end of the lever, 87, and the free end of which slides in an ear, 90, integral with the disc, 78. It will be noted that this spring can only operate to roll the pawl and lock the clutch, once every half revolution of the drive shaft, 44. If the pawl is disengaged, even momentarily, the driven member of the clutch stops instantly because of its large peripheral surface of engagement with the bearing, 80, in which it is mounted. Moreover, if released even momentarily, the pawl is locked in the retracted position by the smooth periphery of the rotor, 79, until the next recess, 82, rotates into registry, again permitting rotation and locking of the pawl, 85, under the influence of spring, 88.

Means for positively unlocking the pawl against the action of spring 88, is provided in the form of diametrically opposite cams, 91, 92, encircling the shaft, 44, but longitudinally slidable thereon into and out of the path of a projecting pin, 93, on the other end of lever, 87, opposite to the spring-pressed end. These cams are movable longitudinally on the rotating shaft 44, but are prevented from rotation therewith by a split clamping collar, 94, which is held by arm, 95. Said arm is mounted on the above described clutch controlling shaft, 63, which is rocked by arm, 62, when lever 57 is tripped by the nut detector mechanism. The control shaft, 63, is given the required endwise reciprocation for moving the cam yoke, 94, 95, by means of a face cam, 96, on the clutch driving shaft, 44. This face cam operates to positively retract the clutch controller shaft, 63, while a spring, 97, encircling said shaft and abutting against bearing, 98, operates non-positively to spring-press the shaft endwise to bring the cams, 91, 92, back into the path of movement of the pawl releasing projection, 93, on lever, 87. The face cam retracts shaft, 63, by engagement with a roller, 99, mounted on a lever arm, 100, locked on shaft, 63.

Shaft, 63, also has mounted thereon and locked thereto, a re-setting arm, 101, carrying a roller, 102, bearing on re-setting cam, 103, on the continuously rotating shaft, 44.

The phases of the various cams on shaft, 44, are such with relation to each other and to the nut feed cam, 24, on shaft, 25, that the above described sequence of operation is preserved. The timing clutch shaft, 44, rotates continuously but is normally without effect so long as the nuts being fed are presented with their crowns toward the detector annulus, 50, but when the base of any nut is presented toward said annulus, the trip is instantly operated and said nut is fed forward from the detector into the turner by the feed bar, 10. Operation of the trip rotates the clutch control shaft, 93, bringing the roller, 99, into the path of cam, 96, which immediately shifts the shaft endwise, bringing the release cams, 91, 92, out of range of the release projection, 93, thereby freeing the pawl, 85, for spring lock engagement with the next recess, 82, or, 83, in the clutch driving member, 79. During the time of rotary and endwise shift of shaft, 63, and thereafter, until the pawl engages, there is a delay period during which the nut which tripped the clutch mechanism has been fed into the turner section, 13, and the plunger, 10, has been retracted out of range of the rotary movement of said turner. As soon as cam 96 has effected the endwise shift and released the clutch pawls, the operating projection of cam, 103, rotates said shaft back to initial position, permitting the lever 57 to snap back under 62, restoring the parts to initial position and leaving the release cams, 91, 92, in position to unlock the clutch the instant 180° rotation of the turner has been completed.

I claim:

1. Apparatus for one-direction presentation of like faces of similar nuts having unlike top and bottom faces, including means for intermittently feeding the nuts edgewise through a guideway and means operating on the successive nuts during successive intermissions of the feed, including a transversely yieldable member and cooperating means for forcing the nut into contact therewith, said yieldable member being formed and arranged for contact with and movement in response to pressure by one face of the nut but not by movement of the other face, and means controlled by said yieldable member operating to reverse improperly faced nuts by turning said nuts on their axes.

2. Apparatus for one-direction presentation of nuts having one-face crowned and the other flat, including means for intermittently feeding the nuts edgewise and means operating on each successive nut during intermission of the feed, including a transversely yieldable member and cooperating means for forcing the nut into face contact therewith, said yieldable member being formed and arranged for contact with and movement in response to pressure by the flat face of the nut but not by the crowned face, and means operated by movement of said yieldable member, including a rotatable guideway section for reversing the direction of improperly faced nuts by turning said nuts on their axes.

3. Means for one-direction presentation of nuts having one face crowned, including means for moving the nuts edgewise, in combination with means for applying face pressure upon each nut, including face-engaging detector means adapted to contact with an annulus of the face of the nut near the periphery thereof and operating differently in response to different pressures developed according as the engaged face is crowned or not and means controlled by the detector for reversing the face presentation of improperly faced nuts by turning said nuts on their axes.

4. Means for one-direction presentation of articles having differently shaped opposite faces, including means for moving the articles edgewise, in combination with means for applying face pressure upon each article and including face-engaging detector means adapted to contact with an annulus of the face of the nut near the periphery thereof operating differently in response to different pressures developed by the different faces, and means controlled by the detector for reversing the face presentation of improperly faced articles by turning said nuts on their axes.

5. Feed mechanism for nuts having only one face crowned, including relatively movable members between which the unlike faces of the nut are forcibly clamped, one of said members having elements adapted to be displaced by pressure of the uncrowned face during the clamping operation, but not by the crowned face and normally inoperative means rendered operative by the displacement for turning the nut which caused such displacement on its axis to reverse it.

6. Feed mechanism for articles having opposite faces of unlike contour, including relatively movable members between which the unlike faces of the article are forcibly clamped, one of said members having a detector element formed and arranged for actuation by pressure when one characteristically contoured face of the article engages it, but to remain unactuated when the characteristically different contour of the other face is presented, and normally inoperative means rendered operative by the displacement for turning the nut which caused such displacement on its axis to reverse it.

7. A machine for crown presentation of nuts in train, including a trip, a detector actuated by contact of nuts presenting their flat faces thereto but having only annular contact with the face of the nut whereby it is not actuated; by those presenting crowns and means controlled by the detector for turning on its axis, crown for base, the nut which operated the trip.

8. A machine for arranging crowned nuts in train, including feed mechanism for advancing the successive nuts, one at a time, at intervals, laterally operating detector mechanism for engaging opposite faces of each successive nut during an interval between feeding movements, said detector mechanism including a trip actuated by nuts presenting flat faces but unactuated by nuts presenting crowned faces, in combination with a delayed action clutch released by said trip and timed with the nut feed mechanism so that the latter feeds forward the nut which operated the trip during the delay period of the clutch, a rotatable guide section into which said nut is fed and connections whereby at the end of the delay period the clutch rotates said guide section 180°.

9. A guideway for gravity feed of nuts edgewise in train, a stop upon which the lowermost nut is fed, an intermittently reciprocating feed plunger for feeding the lowermost nuts, one after another, into a rotatable guideway section adapted to axially turn said nuts, a detector member adjacent one face of said lowermost nut, and a cooperating gauge plunger for forcing the nut into face contact therewith while said feed plunger is retracted.

10. A guideway for gravity feed of nuts edgewise in train, a stop upon which the lowermost nut is fed, an intermittently reciprocating feed plunger for feeding the lowermost nuts, one after another, into a rotatable guideway section, a detector member adjacent one face of said lowermost nut, and a cooperating gauge plunger for forcing the nut into face contact therewith while said plunger is retracted, said detector comprising an annulus, spring-pressed forwardly in position to be forced rearwardly by the nuts presenting plane faces, but not by those presenting crowns, and delayed action clutch mechanism operating to turn said guideway section 180°, after a detector-actuating nut has been fed forward by the feed plunger.

11. A guideway for gravity feed of nuts edgewise in train, a stop upon which the lowermost nut is fed, an intermittently reciprocating feed plunger for feeding the lowermost nuts, one after another, into a rotatable guideway section adapted to axially turn said nuts, a detector member adjacent one face of said lowermost nut, and a cooperating gauge plunger for forcing the nut into face contact therewith while said plunger is retracted; both said feed plungers being spring actuated toward the nut.

12. A vertical guideway for gravity feed of nuts edgewise in train, a stop for the bottom nut of said train, a horizontally reciprocating plunger in operative position for feeding edgewise the successive bottom nuts, one at a time, at intervals, a reciprocating gauge member adjacent one face of a nut on said support and a detector in operative relation to the other face of the nut, against which the nut is forced by said gauge, said detector being in the form of an annulus forced rearwardly by nuts presenting flat bottoms but not by nuts presenting crowns; a nut receiving guide element into which the plunger feeds the nuts and means for rotating the same 180° alternately in opposite directions, including delayed action mechanism controlled by the detector, whereby the guide element rotates after the nut that operated the detector has been fed into said guide.

13. In an apparatus for one-direction presentation of like faces of similar nuts having unlike top and bottom faces, a guideway for gravity feed of nuts edgewise in train, a stop upon which the lowermost nut is fed, movable detector mechanism engaging the faces of said lowermost nut, a rotatable section, an intermittently reciprocating feed plunger for feeding the lowermost nuts edgewise one after another into said rotatable section, and means controlled by said detector mechanism for rotating said section to properly face improperly faced nuts.

14. In an apparatus for one-direction presentation of like faces of similar articles having unlike top and bottom faces, a guideway for gravity feed of said articles edgewise in train, a stop upon which the lowermost article is fed, movable detector mechanism transverse to the guideway engaging the faces of the lowermost article, an intermittently reciprocating plunger for feeding the articles edgewise past the detector mechanism, and means controlled by said detector mechanism for turning improperly faced articles.

Signed at North Tonawanda in the county of Niagara, and State of New York, this nineteenth day of January, A. D. 1926.

CHARLES P. TOPPING.